(12) United States Patent
Coburn et al.

(10) Patent No.: US 12,331,914 B2
(45) Date of Patent: Jun. 17, 2025

(54) SYSTEMS AND METHODS FOR CONTROLLING LIGHT SOURCES

(71) Applicant: Rivian IP Holdings, LLC, Plymouth, MI (US)

(72) Inventors: Matthew Coburn, Milford, MI (US); Robert Skapof, Novi, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 18/143,835

(22) Filed: May 5, 2023

(65) Prior Publication Data
US 2023/0272902 A1 Aug. 31, 2023

Related U.S. Application Data

(63) Continuation of application No. 16/682,342, filed on Nov. 13, 2019, now Pat. No. 11,644,192.

(60) Provisional application No. 62/760,348, filed on Nov. 13, 2018.

(51) Int. Cl.
*H05B 47/155* (2020.01)
*F21V 23/04* (2006.01)
*H05B 45/10* (2020.01)

(52) U.S. Cl.
CPC ......... *F21V 23/0485* (2013.01); *H05B 45/10* (2020.01); *H05B 47/155* (2020.01)

(58) Field of Classification Search
None
See application file for complete search history.

(56) References Cited

U.S. PATENT DOCUMENTS

| 4,668,861 | A | 5/1987 | White |
| 2003/0156422 | A1 | 8/2003 | Tatewaki et al. |
| 2009/0229955 | A1 | 9/2009 | Hein et al. |
| 2009/0231167 | A1 | 9/2009 | Chen |
| 2010/0277316 | A1* | 11/2010 | Schlangen ............... F21S 10/02 315/312 |
| 2012/0081005 | A1 | 4/2012 | Lin et al. |

(Continued)

FOREIGN PATENT DOCUMENTS

| DE | 102016225583 A1 | 6/2018 |
| EP | 2461238 A2 | 6/2012 |

(Continued)

OTHER PUBLICATIONS

International Search Report and Written Opinion received for PCT Patent Application No. PCT/US2019/061160, mailed on Feb. 6, 2020, 10 pages.

*Primary Examiner* — Renan Luque
(74) *Attorney, Agent, or Firm* — Haley Guiliano LLP

(57) ABSTRACT

Lighting control systems and methods for providing dynamic control of multiple light sources with a single input are disclosed herein. When a long touch is detected at a user interface element, a first light source is turned on. If the long touch persists for a predefined time period, a second light source (e.g., an adjacent light source) is also turned on. The luminosity of the first light source may be gradually increased from zero to 100% during the predefined time period. If the long touch persists beyond the predefined time period, the luminosity of the second light source may be gradually increased from zero until the long touch ends or a second longer predefined time period is reached.

17 Claims, 4 Drawing Sheets

(56) References Cited

U.S. PATENT DOCUMENTS

| | | | |
|---|---|---|---|
| 2012/0181951 A1* | 7/2012 | Van Der Zande | F21V 23/0442 |
| | | | 315/294 |
| 2012/0242248 A1* | 9/2012 | Drummond | H05B 47/10 |
| | | | 315/297 |
| 2015/0084515 A1 | 3/2015 | Altamura et al. | |
| 2015/0097495 A1 | 4/2015 | Moore et al. | |
| 2016/0085431 A1 | 3/2016 | Kim et al. | |
| 2016/0091189 A1* | 3/2016 | Brown | G06F 3/04883 |
| | | | 313/511 |
| 2016/0227627 A1 | 8/2016 | Chen | |
| 2016/0242251 A1 | 8/2016 | Newton et al. | |
| 2016/0381770 A1 | 12/2016 | Murakami | |
| 2017/0019978 A1 | 1/2017 | Lashina et al. | |
| 2017/0223807 A1* | 8/2017 | Recker | H02J 13/00006 |
| 2017/0278383 A1 | 9/2017 | Dimberg et al. | |
| 2017/0290132 A1 | 10/2017 | Amrine et al. | |
| 2017/0311402 A1* | 10/2017 | Qiu | F21V 23/0414 |
| 2018/0228003 A1 | 8/2018 | O'Driscoll et al. | |
| 2018/0308435 A1 | 10/2018 | Williams et al. | |
| 2018/0308436 A1 | 10/2018 | Krattiger | |
| 2019/0011116 A1 | 1/2019 | Nakamura et al. | |
| 2019/0042000 A1 | 2/2019 | Kasmieh | |
| 2019/0137056 A1* | 5/2019 | Sreshta | H02J 7/0047 |
| 2019/0150249 A1* | 5/2019 | Bertken | H04Q 9/00 |
| | | | 315/149 |

FOREIGN PATENT DOCUMENTS

| | | |
|---|---|---|
| IN | 203984749 U | 12/2014 |
| WO | 2015/150927 A1 | 10/2015 |
| WO | 2017/017665 A1 | 2/2017 |

* cited by examiner

SYSTEMS AND METHODS FOR CONTROLLING LIGHT SOURCES

CROSS-REFERENCE TO RELATED APPLICATION

This application is a continuation of U.S. patent application Ser. No. 16/682,342, filed Nov. 13, 2019, now U.S. Pat. No. 11,644,192, which claims the benefit of U.S. Provisional Application No. 62/760,348, filed Nov. 13, 2018, which are hereby incorporated by reference in their entireties.

INTRODUCTION

Currently, light control systems (e.g., light control systems of a vehicles) require manual user control of either each individual light source or all light sources together. For example, to control each light source located on a ceiling of a vehicle, the user has to individually turn on or off each light source to achieve a desired lighting configuration. Such systems are inefficient because they require a large number of user inputs at different locations to achieve a desired lighting configuration of each light source. Operating such a system requires a large time expenditure to achieve the desired lighting and introduces a possibility of user mistakes.

SUMMARY

In accordance with the present disclosure, systems and methods are provided that improve the operation of light control systems. The present disclosure describes a system that provides dynamic control of multiple light sources with a single input. For example, a vehicle may have any number of light sources (e.g., capacitive touch lamps). The illumination system describe herein allows a user to touch a single light source or a single user interface element to turn on one or more lights. If the illumination system determines that the touch is a long touch, the system will gradually increase the luminosity of that light from zero to 100%. If the long touch persists beyond a threshold time period (e.g., a time period needed for the lamp to reaches 100% luminosity), another light or lights that are adjacent to the first lamp will also become activated. For example, the light level of other lights may begin to gradually increase from zero to 100%. If the long touch persists past another threshold time period (e.g., a time period needed for all lamps adjacent to the first light to reach the 100% light level), a third layer of light may become activated. For example, the light level of the third layer of light may begin to gradually increase from zero to 100%. The process may continue until all lights are at 100% luminosity, or until the long touch ends. At any time, the user can terminate the long touch (e.g., by taking the finger off the capacitive touch lamp) to maintain the current light level of all lights indefinitely. After this, a short touch of any of the lights, or a short touch of light designated as the primary lamp, causes the system to turn off all the lamps that were activated. This technique can be applied to any system where multiple lights or lamps need to be controlled. For example, this technique can be used to control overhead lamps of a vehicle, lamps located in the instrument panel of the vehicle, door pocket lights, footwell lamps, and lamps in any other location.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

DETAILED DESCRIPTION

The present disclosure is directed to methods and systems for controlling multiple light sources. In some embodiments, an illumination system includes a first light source and a second light source. In some embodiments, the illumination system includes control circuitry. The control circuitry may detect a first long touch via a touch interface, and, in response, activate a first light source. If the touch persists, the control circuitry may gradually increase the light level of the first light source up to 100%. In some embodiments, if the touch persists after a certain period of time (e.g., after the first light source reaches 100% light level), the control circuitry may activate the second light source.

As referred to herein, the term "touch interface" refers to any kind of system or device capable of detecting touch or the presence of a body part. For example, touch interface may be a capacitive touch element. In another example, the touch interface may be a part of a larger touchscreen display. In yet another example, the touchscreen interface may include a push button or a switch.

As referred to herein, the terms "light" and "light source" refer to any kind of mechanism or device that can create illumination (e.g., by emission of photons). For example, a light source may refer to a light emitting diode (LED), incandescent lightbulb, compact fluorescent lamp, any other source of light, or any combination thereof.

As referred to herein, the term "short touch" refers to a touch that lasts for less than a threshold period of time (e.g., 0.5, 1.0, or 1.5 seconds). In some embodiments, the threshold may be predefined. In some embodiments, the threshold may be user-selectable.

As referred to herein, the term "long touch" refers to a touch that lasts for more than a threshold period of time (e.g., 0.5, 1.0, or 1.5 seconds). In some embodiments, the threshold may be predefined. In some embodiments, the threshold may be user-selectable.

Figure 1A:
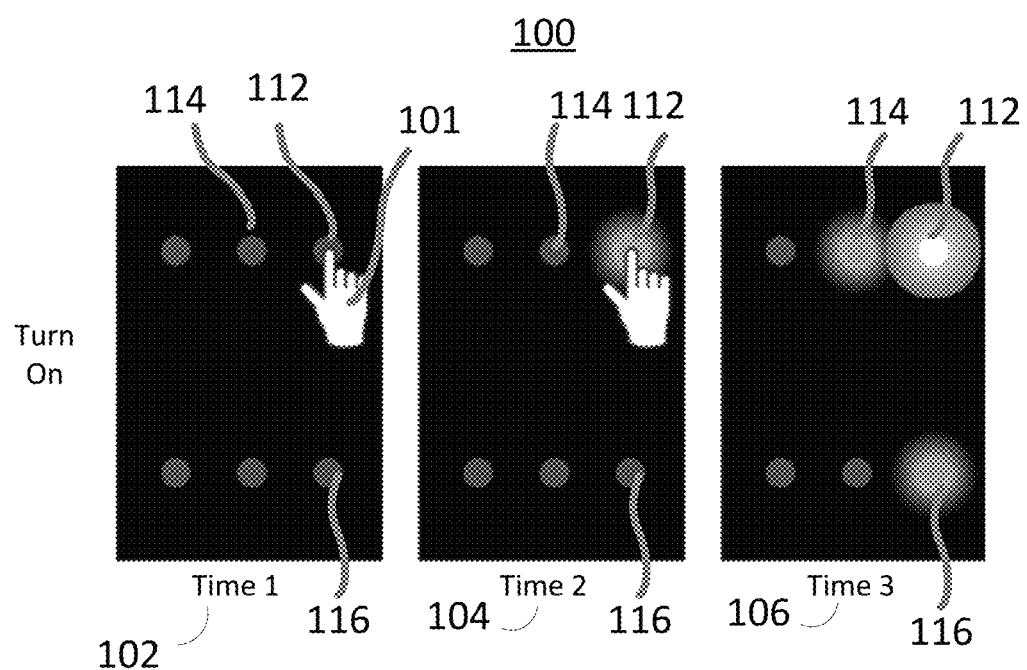
FIG. 1A shows a time sequence of illustrations of illumination settings of six light sources, in accordance with some embodiments of the present disclosure.

FIG. 1A depicts a time sequence of illustrations of illumination settings 100 of six light sources at first time 102, second time 104, and third time 106. Illumination settings 100 are depicted for six light sources, but any number of light sources may be included.

FIG. 1A depicts an illustrative scenario for turning on lights. At first time 102, control circuitry of an illumination system may receive a touch input. For example, the user may touch with finger 101 the light capacitive light source 112. In some embodiments, the touch input may include a user touching a button or an icon displayed on touchscreen display (not shown). In some embodiments, the touchscreen display may have an icon representing each light source of the illumination system.

If the touch input is a short touch, control circuitry may immediately activate light source 112 at 100% light level. In this case, adjacent light sources 114 and 116 remain unlit. In some embodiments, the user may provide separate short touch inputs to activate other light sources (e.g., light sources 114 and 116).

At second time 104, control circuitry may determine that the touch input is a long touch. In this case, control circuitry may gradually increase the light level of the light source 112 over a first time period (e.g., 5 seconds.) In some embodiments, the control circuitry may gradually increase the light level of light source 112 as long as the long touch persists. For example, light source 112 may have the following light levels during the first time period (as depicted by Table 1):

TABLE 1

| Time | Light Level |
|---|---|
| 0 seconds | 0% |
| 1 second | 25% |
| 3 seconds | 50% |
| 4 seconds | 75% |
| 5 seconds | 100% |

In some embodiments, the light level may be proportional to the amount of time that has elapsed from the detection of the first long touch at first time 102.

In some embodiments, at third time 106, after the conclusion of the first time period (e.g., 5 seconds after second time 104), light source 112 may be at the 100% level. If the long touch persists past that point, the control circuitry may activate light sources adjacent to light source 112 (e.g., light sources 114 and 116). In some embodiments, the control circuitry may activate light sources 114 and 116 at 0% light level and gradually increase their light level to 100% over a duration of a second time period (e.g., 5 seconds) as long as the long touch persists. Once the light sources 114 and 116 are at 100% luminosity, control circuitry may continue activating light sources adjacent to light sources 114 and 116 (but not adjacent to light source 112 because these light sources have already been activated.).

In some embodiments, if the long touch ends, control circuitry will indefinitely maintain (e.g., until another touch input is received) the state of light sources that that existed at the time when the long touch ended. For example, if the long touch ends at time 104, light source 112 may remain activated indefinitely, while light sources 114 and 116 may remain un-activated indefinitely. In another example, if the long touch ends at time 106, light sources 112, 114, and 116 may remain activated indefinitely.

Figure 1B:
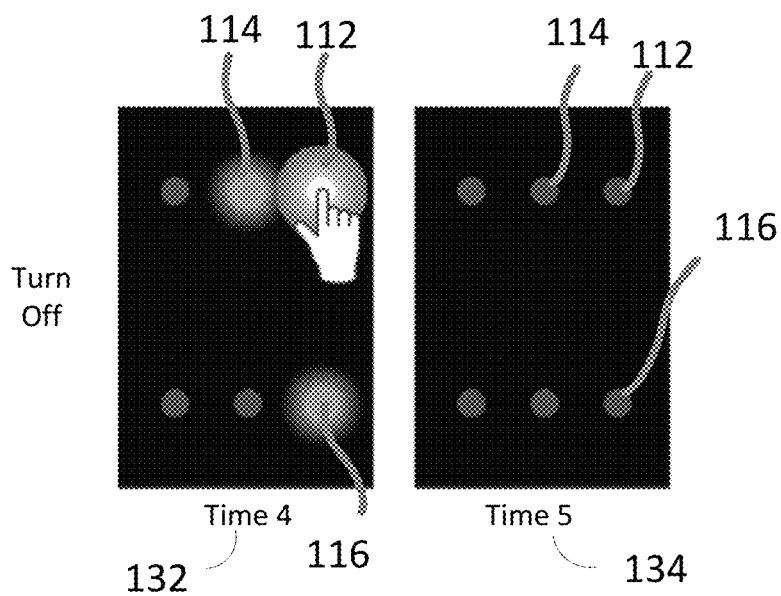
FIG. 1B shows another time sequence of illustrations of illumination settings of six light sources, in accordance with some embodiments of the present disclosure.

FIG. 1B shows another time sequence of illustrations of illumination settings 120 of six light sources at fourth time 132, and fifth time 134. In some embodiments, system illumination settings 120 are shown for the same light sources depicted in FIG. 1A. FIG. 1B provides an illustrative scenario for turning off lights. At fourth time 132, light source 112 may be at 100% light level, while light sources 114 and 116 may be at 50% light level.

In some embodiments, at fifth time 134, control circuitry may detect a short touch from the user (e.g., a user may touch light source 112, or a representation of light source 112 on a touchscreen display). In some embodiments, in response to the touch, control circuitry may immediately turn off all light sources. In some embodiments, in response to the touch, control circuitry may also immediately turn off light sources adjacent to light source 112.

For example, light source 112 may be designated as a master light source and light sources 114 and 116 may be designated as light sources subordinate to light source 112. In this case, a short touch (or a long touch) of the master light source (e.g., light source 112) may result in the master light and all its subordinate lights (e.g., light sources 114 and 116) turning off. In another example, a short touch (or a long touch) of a subordinated light source (e.g., light source 114) may result only in light source 114 turning off, while other light sources maintain their original state before the touch.

In some embodiments, a short touch of any lit light source (e.g., light source 112) may result in only that light source turning off, while a long touch of a light source may result in all light sources turning off. Alternatively, a long touch of any lit light source (e.g., light source 112) may result only in that light source turning off, while a short touch of a light source may result in all light sources turning off.

In some embodiments, when the control circuitry detects a long touch (e.g., a user touch of light source 112, or a user touch of a representation of light source 112 on a touchscreen display), the system may begin to gradually deactivate light source 112. For example, the light level of light source 112 may decreased from 100% to 0% over a 5-second period. In some embodiments, if the long touch persists past the first time period and into a second period of time (e.g., time period needed to decrease the light level of light source 112 to 0%), the control circuitry may deactivate light sources adjacent to light source 112. In some embodiments, control circuitry may gradually decrease the light level of light sources 114 and 116 from 50% to 0%, as long as the long touch persists. In some embodiments, in response to detecting a long touch, control circuitry gradually decreases the light level of light sources 114 and 116 from 50% to 0%. Once the light sources 114 and 116 are at 0% light level, and the long touch persists, control circuitry may also start to gradually decrease the light level of light source 112.

Figure 1C:
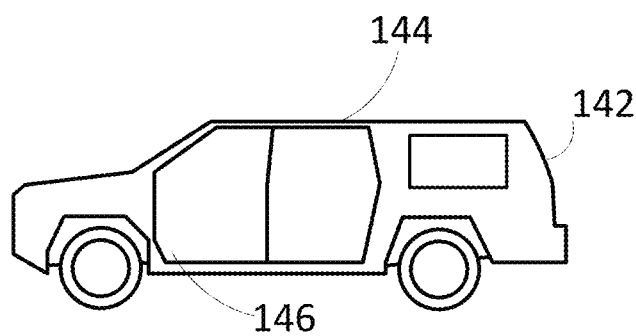
FIG. 1C shows a side view of a vehicle that may include multiple light sources, in accordance with some embodiments of the present disclosure.

FIG. 1C shows a side view of vehicle 140 that includes light sources depicted in FIGS. 1A and 1B. In some embodiments, the vehicle 140 may be a coupe, a sedan, a truck, a bus, or any other type vehicle. In some embodiments, light sources of system 100 may be located on ceiling 144 of vehicle 140, in footwell 146 of vehicle 140, in trunk space 142 of vehicle 140, in any other part of vehicle 140, or in any combination thereof.

Figure 2:
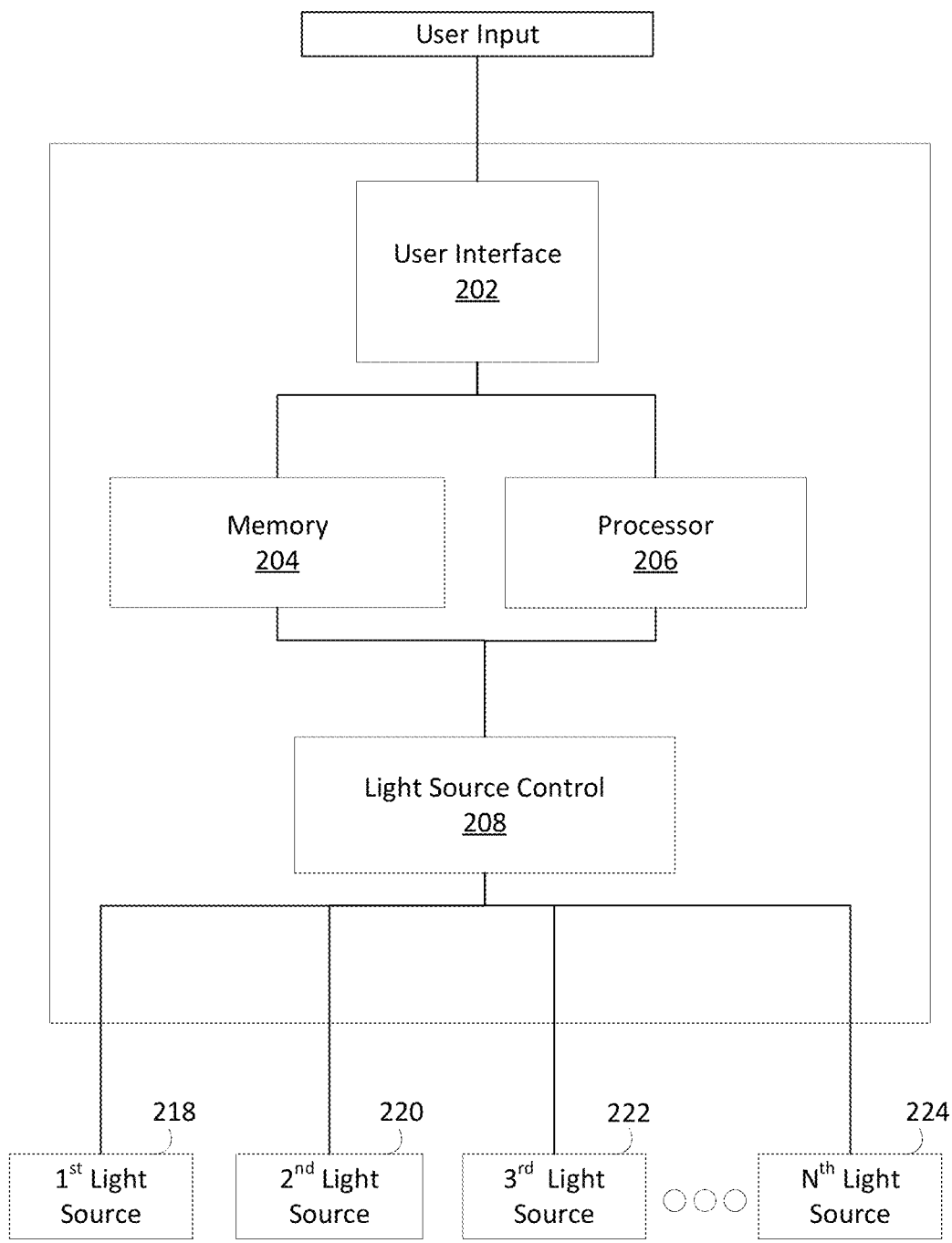
FIG. 2 shows a block diagram of components of a light control system, in accordance with some embodiments of the present disclosure.

FIG. 2 shows a block diagram of components of an illumination system 200 (e.g., an illumination system of vehicle 140 that may include light sources depicted in FIGS. 1A and 1B), in accordance with some embodiments of the present disclosure. In some embodiments, illumination system 200 may include processor 206. Processor 206 may comprise a hardware CPU for executing commands stored in memory 204 or software modules, or any combination thereof. In some embodiments, illumination system 200 may be a part of a vehicle (e.g., vehicle 140 of FIG. 1C). For example, light sources 218, 220, 222, and 224 may be located on ceiling 144 of vehicle 140.

In some embodiments, illumination system 200 may include memory 204. In some embodiments, memory 204 may include hardware elements for non-transitory storage of commands or instructions, that, when executed by processor 206, cause processor 206 to operate illumination system 200 in accordance with embodiments described above and below.

In some embodiments, processor 206 may be communicatively connected to user interface 202 (e.g., a touch interface). For example, interface 202 may be capable of receiving touch input from capacitive light sources 218, 220, 222, and 224. In some embodiments, interface 202 may be capable of receiving touch input from a touchscreen that displays icons indicative of light sources 218, 220, 222, and 224.

In some embodiments, processor 206 may be communicatively connected to light source control 208. Light source control 208 may be able to turn on or off any of light sources 218, 220, 222, and 224. In some embodiments, light sources 218, 220, 222, and 224 may include light sources 112, 114, and 116 of FIGS. 1A and 1B. In some embodiments, there may be any number of controllable light sources. In some embodiments, light source control 208 may be able to control the light level of light sources 218, 220, 222, and 224. For example, light source control 208 may able to provides varying amount of electrical power to each of light sources 218, 220, 222, and 224 to achieve any percentage light level.

In some embodiments, light source control 208 may activate, deactivate and vary light levels of light sources 218, 220, 222, and 224 based on instructions received from processor 206. In some embodiments, processor 206 may instruct light source control 208 to activate, deactivate and vary light levels of light sources 218, 220, 222, and 224 based on input received from user interface 202, (e.g., as described with respect to FIG. 1A and FIG. 1B).

Figure 3:
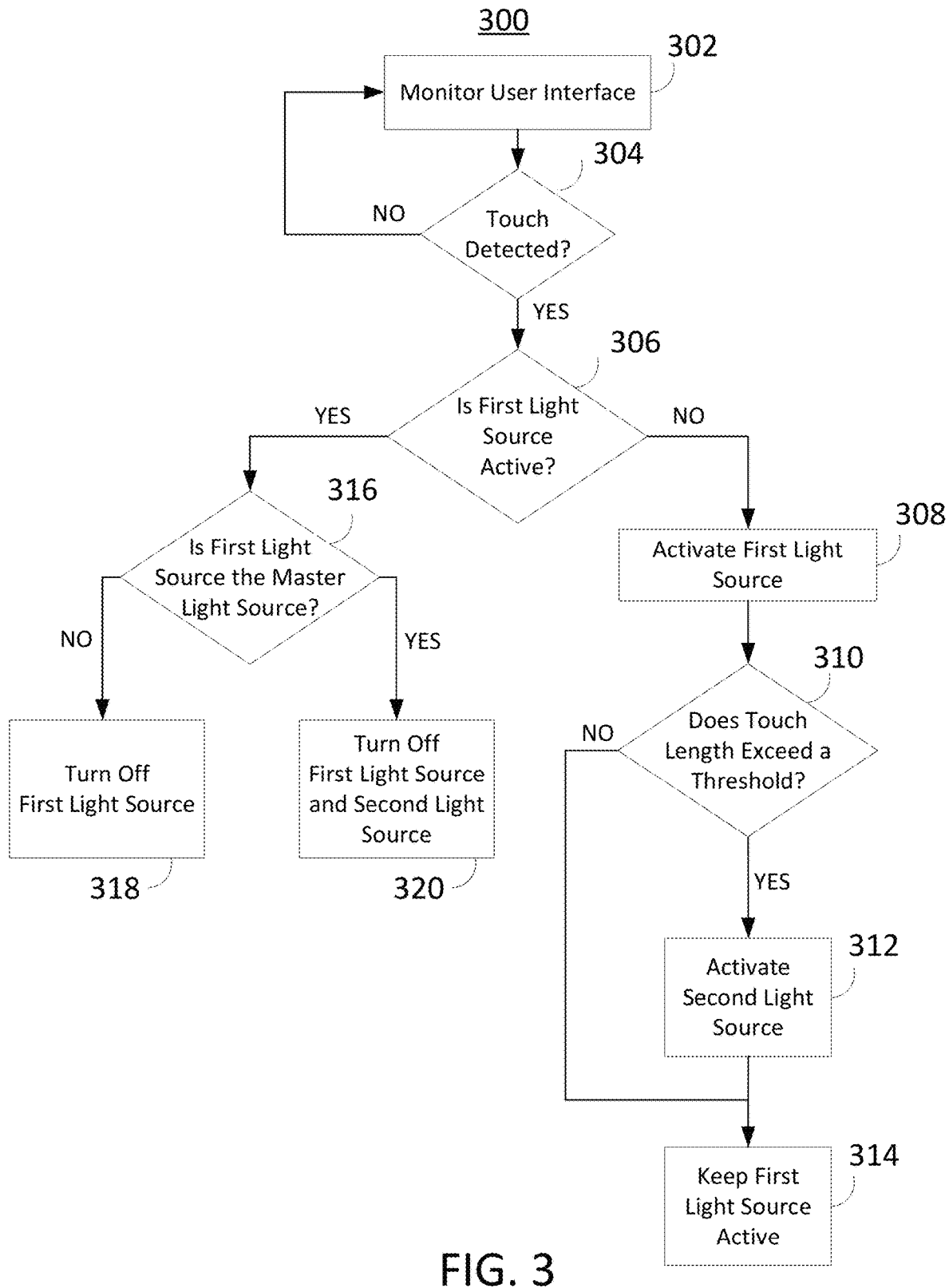
FIG. 3 shows a flow chart for an exemplary method for operating a light control system, in accordance with some embodiments of the present disclosure.

FIG. 3 is an illustrative flowchart of a process 300 for controlling a lighting system (e.g., system 200 of FIG. 2), in accordance with some embodiments of the disclosure. Process 300 may be executed by a processor (e.g., by processor 206 of FIG. 2).

At 302, the processor may monitor a user interface. For, example, the processor may receive and analyzes signal received from user interface 202. In some embodiments, the processor may process touch signals received directly from capacitive touch lights, or from another interface configured to control the light sources (e.g., a touchscreen display that displays representation of controllable light sources). In particular, the processor may monitor a user interface element associated with a first light source (e.g., light source 112 of FIG. 1). In some embodiments, the user interface element may be a capacitive touch feature of the first light source. In some embodiments, the user interface element may be a visual representation of the first light source on a touchscreen display.

At 304, the processor may check whether a touch (e.g., a long touch) is detected via the user interface element associated with a first light source. For example, the processor may determine whether the user has continuously touched a capacitive touch element of the first light source for more than 1 second. In another example, the processor may determine whether the user has continuously touched a visual representation of the first light for more than 1 second. If such a touch is not detected, process 300 may return to step 302 and continue monitoring the user interface. If the touch is detected, the processor proceeds to step 306.

At 306, the processor checks whether the first light source is already active (e.g., producing light). If the first light source is turned off, the processor interprets the touch as a command to turn on the first light source and proceeds to step 308. If the first light source is turned on, the processor interprets the touch as a command to turn off the first light source and proceeds to step 316.

At step 308, the processor may activate the first light source. For example, the processor may send a request to provide power to the first light source to light source control 208 of FIG. 2, which may then provide an electric current to the first light source to enable the first light source to emit light. In some embodiments, the first light source is immediately turned on to 100% capacity. In some embodiments, the current provided to the first light source is increased gradually if the touch detected at step 304 persists (e.g., at rate shown in FIG. 1 or at any other rate).

At 310, the processor checks whether the touch detected at step 304 has persisted longer than a threshold time period (e.g., longer than 5 seconds). If so, process 300 proceeds to step 312, where the processor activates a second light source (e.g., light source 114, which is adjacent to the first light source). For example, the processor may send a request to provide power to the second light source to light source control 208 of FIG. 2, which may then provide an electric current to the second light source to enable the second light source to emit light. In some embodiments, the second light source is immediately turned on to 100% capacity. In some embodiments, the current provided to the second light source is increased gradually if the touch detected at step 304 persists beyond the threshold of step 310. In some embodiments, when the touch stops, the processor maintains the current states of both the first light source and the second light source indefinitely (e.g., until another input is received via the user interface).

At 316, the processor may check whether the first light source is designated as a master light. For example, this may be a setting set by the manufacturer or selected by a user during a setup of the light sources. If the first light source is a master light, process 300 proceeds to step 320, otherwise, process 300 proceeds to step 318.

At 318, the processor may turn off the first light source. For example, the processor may send a request to cease provision of power to the first light source to light source control 208 of FIG. 2, which may then cease providing an electric current to the first light source to stop the first light source from emitting light. In some embodiments, the first light source is immediately turned to 0% capacity. In some embodiments, the current provided to the first light source is decreased gradually if the touch detected at step 304 persists.

At 320, the processor may turn off the first light source and the second light source (e.g., because the second light source is subordinate to the first light source). For example, the processor may send a request to cease provision of power to the first and second light sources to light source control 208 of FIG. 2, which may then cease providing an electric current to the first and second light sources to stop them from emitting light. In some embodiments, the first and second light sources are immediately turned to 0% capacity. In some embodiments, the current provided to the first light source is decreased gradually if the touch detected at step 304 persists. Once the current provided to the first light source is reduced to 0%, and the touch continues to persist, the current provided to the second light source is also gradually reduced to 0%.

It will be understood that process 300 is merely illustrative and that various modification can be made within the scope of the disclosure. For example, in some embodiments, the second light source comprises multiple second light sources. As another example, 310 and 312 may be repeat for each of a third, fourth or higher number of light sources. For example, once the second light source is at full capacity, if the touch persists beyond a second higher threshold amount of time, a third light source is activated.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system comprising:
a light source; and
control circuitry configured to:
in response to a first touch detected on the light source, activate the light source;
in response to a second touch detected on the light source, decrease a light level of the light source, wherein the decreasing is performed based on: (a) the second touch being a long touch and (b) the light source being at 100% light level when the long touch was detected; and
in response to a third touch detected on the light source, deactivate the light source, wherein the deactivating is performed based on the third touch being a short touch.

2. The system of claim 1, wherein the light source is located on a vehicle.

3. The system of claim 1, wherein the light source is located on a ceiling of a vehicle.

4. The system of claim 1, wherein the light source comprises a capacitive touch element and a light emitting diode, and wherein the first touch is detected with the capacitive touch element.

5. The system of claim 4, wherein the control circuitry is configured to detect each of the first touch, the second touch, and the third touch by processing touch signals received from the capacitive touch element.

6. The system of claim 1, wherein the control circuitry is configured to:
activate the light source in response to the first touch by gradually increasing the light level of the light source; and
decrease the light level of the light source in response to the second touch by gradually decreasing the light level of the light source.

7. The system of claim 6, wherein the control circuitry is configured to deactivate the light source in response to the third touch by ceasing power to the light source.

8. A method comprising:
activating a light source in response to a first touch detected on the light source;
decreasing a light level of the light source in response to a second touch detected on the light source, wherein the decreasing is performed based on: (a) the second touch being a long touch and (b) the light source being at 100% light level when the long touch was detected; and
deactivating the light source in response to a third touch detected on the light source, wherein the deactivating is performed based on the third touch being a short touch.

9. The method of claim 8, wherein the light source is located on a vehicle.

10. The method of claim 8 wherein the light source comprises a capacitive touch element and a light emitting diode.

11. The method of claim 10, further comprising:
processing signals, using control circuitry, received from the capacitive touch element to detect the first touch, the second touch, and the third touch.

12. The method of claim 10, further comprising:
detecting, using control circuitry, a first interaction with the capacitive touch element to detect the first touch;
detecting, the using the control circuitry, a second interaction with the capacitive touch element to detect the second touch; and
detecting, using the control circuitry, a third interaction with the capacitive touch element to detect the third touch.

13. The method of claim 8, wherein:
activating the light source in response to the first touch comprises gradually increasing the light level of the light source; and
decreasing the light level of the light source in response to the second touch comprises gradually decreasing the light level of the light source.

14. The method of claim 13, wherein deactivating the light source in response to the third touch comprises ceasing power to the light source.

15. A vehicle, comprising:
a capacitive touch light located on a ceiling of the vehicle; and
control circuitry configured to:
in response to detecting a first touch on the capacitive touch light, activate the capacitive touch light;
in response to detecting a second touch on the capacitive touch light, decrease a light level of the capacitive touch light, wherein the decreasing is performed based on: (a) the second touch being a long touch and (b) the capacitive touch light being at 100% light level when the long touch was detected; and
in response to detecting a third touch on the capacitive touch light, deactivate the capacitive touch light, wherein the deactivating is performed based on the third touch being a short touch.

16. The vehicle of claim 15, wherein the capacitive touch light comprises a capacitive touch element and a light emitting diode, and wherein the control circuitry is configured to detect each of the first touch, the second touch, and the third touch, by processing touch signals received from the capacitive touch element.

17. The vehicle of claim 15, wherein the control circuitry is configured to:
activate the capacitive touch light in response to the first touch by gradually increasing the light level of the capacitive touch light; and
decrease the light level of the capacitive touch light in response to the second touch by gradually decreasing the light level of the capacitive touch light.

* * * * *